(12) United States Patent
Wang et al.

(10) Patent No.: US 7,200,735 B2
(45) Date of Patent: Apr. 3, 2007

(54) HIGH-PERFORMANCE HYBRID PROCESSOR WITH CONFIGURABLE EXECUTION UNITS

(75) Inventors: Albert Wang, Los Altos, CA (US); Christopher Rowen, Santa Cruz, CA (US); Bernard Rosenthal, Monte Sereno, CA (US)

(73) Assignee: Tensilica, Inc., Santa Clara, CA (US)

( * ) Notice: Subject to any disclaimer, the term of this patent is extended or adjusted under 35 U.S.C. 154(b) by 407 days.

(21) Appl. No.: 10/120,849

(22) Filed: Apr. 10, 2002

(65) Prior Publication Data

US 2005/0166038 A1 Jul. 28, 2005

(51) Int. Cl.
G06F 15/80 (2006.01)
G06F 9/44 (2006.01)

(52) U.S. Cl. .......................... 712/33; 712/34; 712/227

(58) Field of Classification Search ................. 712/34, 712/36, 227, 33; 716/16, 17, 18
See application file for complete search history.

(56) References Cited

U.S. PATENT DOCUMENTS

| | | | | |
|---|---|---|---|---|
| 4,100,601 A * | 7/1978 | Kaufman et al. | ............. | 710/32 |
| 5,280,592 A | 1/1994 | Ryba et al. | ................. | 395/375 |
| 5,357,237 A * | 10/1994 | Bearden et al. | .......... | 340/146.2 |
| 5,361,373 A | 11/1994 | Gilson | ........................ | 395/800 |
| 5,524,262 A * | 6/1996 | Colwell et al. | ............... | 712/23 |
| 5,577,259 A * | 11/1996 | Alferness et al. | ............ | 712/41 |
| 5,590,305 A * | 12/1996 | Terrill et al. | ............... | 711/103 |
| 5,625,784 A | 4/1997 | Purcell | ....................... | 395/386 |
| 5,696,956 A | 12/1997 | Razdan et al. | ............. | 395/568 |
| 5,778,208 A | 7/1998 | Eickemeyer et al. | ....... | 395/379 |
| 5,819,064 A | 10/1998 | Razdan et al. | ............. | 395/500 |
| 5,923,893 A | 7/1999 | Moyer et al. | ......... | 395/800.38 |
| 6,035,123 A | 3/2000 | Razdan et al. | ............. | 395/709 |
| 6,102,963 A * | 8/2000 | Agrawal | ..................... | 716/17 |
| 6,145,074 A | 11/2000 | Asato | ........................ | 712/218 |
| 6,157,997 A | 12/2000 | Oowaki et al. | | |
| 6,182,203 B1 * | 1/2001 | Simar et al. | .................. | 712/22 |
| 6,185,126 B1 | 2/2001 | Rodgers et al. | ............ | 365/154 |
| 6,336,209 B1 * | 1/2002 | Nishihara et al. | ............ | 716/17 |
| 6,584,525 B1 * | 6/2003 | Klingman | ................... | 710/118 |
| 6,832,117 B1 | 12/2004 | Miyamori | | |

(Continued)

FOREIGN PATENT DOCUMENTS

EP 0 329 418 A2 5/1989

(Continued)

OTHER PUBLICATIONS

Gonzalez, "Configurable and Extensible Processors Change System Design," Tensilica, Inc. slide presentation (undated).

(Continued)

Primary Examiner—Daniel Pan
(74) Attorney, Agent, or Firm—Pillsbury Winthrop et al.

(57) ABSTRACT

A new general method for building hybrid processors achieves higher performance in applications by allowing more powerful, tightly-coupled instruction set extensions to be implemented in reconfigurable logic. New instructions set configurations can be discovered and designed by automatic and semi-automatic methods. Improved reconfigurable execution units support deep pipelining, addition of additional registers and register files, compound instructions with many source and destination registers and wide data paths. New interface methods allow lower latency, higher bandwidth connections between hybrid processors and other logic.

71 Claims, 5 Drawing Sheets

FOREIGN PATENT DOCUMENTS

| EP | 0 871 108 | 10/1998 |
| --- | --- | --- |
| JP | 04-060719 | 2/1992 |
| JP | 7-503804 | 4/1995 |
| JP | 7-175631 | 7/1995 |
| JP | 10-254696 | 9/1998 |
| JP | 2000-235490 | 8/2000 |
| JP | 2003-518280 | 8/2000 |
| JP | 2000-284945 | 10/2000 |
| JP | 2001-92662 | 4/2001 |
| JP | 2003-208305 | 7/2003 |
| WO | WO 94/14123 | 6/1994 |
| WO | WO 00/46704 | 8/2000 |

OTHER PUBLICATIONS

Compton et al., "Configurable Computing: A Survey of Systems and Software," Northwestern University, Dept. of ECE, Technical Report, 1999.

Hauck et al., "The Chimaera Reconfigurable Functional Unit," IEEE Symposium on FPGAs for Custom Computing Machines, 1997.

Razdan et al., "A High-Performance Microarchitectures with Hardware-Programmable Functional Units," Published in *Proc. of MICRO-27*, Nov. 1994.

Wang et al., "Hardware/Software Instruction Set Configurability for System-on-Chip Processors," Tensilica, Inc., paper presented at *Design Automation Conference*, Jun. 2001, Las Vegas, Nevada.

PCT Notification of Transmittal of the International Search Report dated Mar. 8, 2004, citing the above references.

PCT/US03/09337; Notification of Transmittal of the International Search Report dated May 28, 2004.

* cited by examiner

Hybrid Processor Patent Draft

Figure 5

| | | | | | | | |
|---|---|---|---|---|---|---|---|
| Format 0 | 0000 | major | minor | R[r] | R[s] | R[t] | |
| Format 1 | 0000 | major | minor | | R[s] | R[t] | |
| Format 2 | 0000 | major | minor | | | R[t] | |
| Format 3 | 0000 | major | minor | R[r] | S[x] | S[y] | S[z] |
| Format 4 | 0000 | major | minor | R[r] | S[x] | S[y] | |
| Format 5 | 0000 | major | S[a] S[b] S[c] | S[x] | S[y] | S[z] | |
| Format 6 | 0000 | major | mino S[b] S[c] | S[x] | S[y] | S[z] | |
| Format 7 | 0000 | major | mino S[b] S[c] | S[x] | S[y] | | |

HIGH-PERFORMANCE HYBRID PROCESSOR WITH CONFIGURABLE EXECUTION UNITS

BACKGROUND OF THE INVENTION

1. Field of the Invention

The present invention relates to a processor, and more particularly to a high-performance hybrid processor with configurable execution units.

2. Background of the Related Art

Application-Specific Processors

Microprocessors are used in broad array of electronic applications, because their programmability via software allows rapid development and modification of very complex tasks. They form the heart of both general-purpose computer systems and specialized electronic equipment ranging from network routers to cellular telephones. Advances in the speed and density of semiconductor technology enables the creation of microprocessors that are faster, smaller and lower power than succeeding designs. They are used in the billions today because of they are both convenient to program to serve the task at hand, and efficient enough to meet requirements. The traditional economics of integrated circuit design—the heavy engineering effort to design and verify a new microprocessor design, plus significant prototyping costs—encourages processors that can be used for many different tasks.

Most microprocessor designs are general-purpose. They include a fixed set of features—instruction set, memory systems and interfaces—that make the processor applicable to a wide range of different tasks. However, these generic processors are inadequate for many important tasks. In particular, the programmer must often use long sequences of generic instructions to compute the necessary results for a particular application task. This inefficiency may mean that electronic system is not fast enough, or dissipates too much power. Thus, the generic microprocessor cannot easily be used in such circumstances.

The Attraction of Universal Platforms

The ideal solution is an application-specific processor, which shares with generic processors the capacity for easy programming from high-level languages, but which includes exactly the right set of instructions for a specific set of tasks. Application-specific instruction sets can reduce the number of instructions that must be executed and the time for execution by up to hundreds of fold, depending on the application and the instruction set. For any given application-specific instruction set, the improvements may be limited to a small set of applications. Therefore it is important to reduce the cost and effort of developing and building a microprocessor tuned to a specific application.

There are two essential components to the cost and effort. The first component is the engineering effort to discover, describe and design the new microprocessor and the associated software. Essential tasks may include the following:

Analysis of the target applications to find performance bottlenecks and target code sections for instruction set optimization Definition of new instructions which reduce the number of processor clock cycles required for execution Detailed design of logic for implementation of the enhanced processor including enhanced instruction decode and new instruction execution units.

Development of new software development tools, especially new assemblers, high-level language compilers and other software generators to allow the program to use the enhanced instructions and other features.

Any adaptation of runtime software, such as operating systems and software libraries that may be needed to manage the enhanced hardware resources (registers, memories and instructions) of the processor.

The second component of the effort for application-specific processor development is the creation of the integrated semiconductor circuit that implements the complete processor with its enhanced instruction set. This implementation must strike a balance between low prototyping cost and low volume manufacturing cost. A fully customized design, in which all logic gates, memories and wiring is optimized for the target processor definition, will typically achieve the smallest size, lowest power and lowest volume manufacturing cost, but the one-time costs for development and prototyping may be very high. The time to design and manufacture prototypes will typically be months. For low to moderate manufacturing volumes, the amortized cost of prototyping may be larger than direct manufacturing costs.

The first component of cost and effort is addressed by processor generation tools, such as described by A. Wang, E. Killian, D. Maydan, C. Rowen, "Hardware/Software Instruction Set Configurability for System-on-Chip Processors", Proceedings of Design Automation Conference, 2001 or R. Gonzalez, "Configurable and Extensible Processors Change System Design" Proceedings of Hot Chips 11, 1999. These tools let designers of electronic systems rapidly discover, describe, validate new instruction sets and generate complete hardware designs and corresponding software.

The second component is critically important for low volume designs, and solutions have been proposed. For example, the entire microprocessor can be implemented in a fast prototyping format, based on field-programmable gate array devices. Unfortunately, the complete flexibility of these devices imposes higher costs per electronic function and lower clock rates. Processors implemented in field-programmable logic are routinely more than five times slower and consume more than ten times as much silicon area as the identical processors implemented using more customized standard-cell circuit implementation. These standard-cell processors may, in turn be half the speed of equivalent processors implemented with carefully hand-tuned circuits. Therefore, it is attractive to consider hybrid implementation, where a base processor, including common instructions, registers, memories and interfaces, is implemented using fast dense circuits, and application-specific extensions are implemented by rapidly configuring a generic section of slow, but flexible field-programmable or reconfigurable logic. Ideally, this would yield a standard design, perhaps implemented on a single integrated circuit, with the speed and volume cost characteristics of a more fully customized design, but with the low prototyping costs and effort of reconfigurable logic circuits.

Choices in Processor—FPGA Coupling

Researchers have described a number of different possible solutions for hybrids of microprocessors and reconfigurable logic for application-specific processing. Gilson U.S. Pat. No. 5,361,373 outlines the combination of a processor circuit and separate standard field-programmable gate array (FPGA) devices to form a hybrid, but does not detail the communication between them, or describe a systematic method for developing configurations or programming the processor. K. Compton, S. Hauck "Configurable Computing: A Survey of Systems and Software", Technical Report, Northwestern University, Dept of ECE, 1999 present a survey possible approaches to hybrids, categorized into four types, shown in their relationship to the processor 100 and the data memory 150, all together in FIG. 1, though no system is likely to contain more than one type of reconfigurable processing unit.

These four types are: (1) Reconfigurable function units 110 within processor—function units directly controlled by processor instructions and have access to internal processor registers. The latency of operations is one or a handful of cycles. (2) Reconfigurable co-processors 120—function units that operate without constant control by the processor, but may have access to processor memory. The latency of operations is measured in hundreds of cycles or more. (3) Attached processing unit 130—function units that operate with very little processor supervision for long periods of time. The processing units 130 cannot access processor local memories, such as the data memory 150 illustrated in FIG. 1.

Communication between the general-purpose processor 100 and the reconfigurable processing unit 130 occurs on a bus 102 and may take tens of cycles. The latency of operations is typically much greater than for co-processors. (4) Standalone processing unit 140—function units with complete independent control that operation independently of any other processor. They are typically accessed over a network 106 and have very long latencies, since they need to go through a network interface 104 and data bus 102 in order to communicate with processor 100.

Of the four types described, the reconfigurable function units 110 within the processor 100 appear to achieve lower latency and higher data bandwidth than the other forms of hybridization. For applications with low data transfer rates, the type of hybridization will not have a significant effect. For applications that require much data to be exchanged with the processor, however, this organizational choice can have a dramatic impact. When the reconfigurable function unit is tightly-coupled to the processor, the function unit and processor can exchange several operands per cycle—at least two source operands and one result operand—and the latency of transfer is just a fraction of one cycle. By contrast, the co-processor 120, attached processor 10, and standalone processing unit 140 arrangements require more than one cycle of latency for transfer and rarely can achieve even one operand per cycle.

A significant liability in placing a reconfigurable unit within a processor is the possible lack of parallelism between operations of the processor and the reconfigurable function units. The present invention focuses on fundamental improvements in such tightly coupled reconfigurable units that increase the operand bandwidth, reduce operand latency and maximize parallelism between the base processor and the function units and among the function units.

Simple Instruction Set Extensions

Some simple examples of tightly coupled reconfigurable function units have been described. R. Razdan, M. D. Smith, "A High-Performance Microarchitecture with Hardware-Programmable Function Units", Proceedings of MICRO-27, November 1997 and U.S. Pat. Nos. 5,696,956, 5,819,064, and 6,035,123 have described a simple hybrid of a RISC base processor and a field-programmable logic array used to implement the combinatorial logic for additional simple RISC instructions. The field programmable logic is based on n-input, 1-output look-up tables (LUTs) similar to those used in popular commercial FPGAs. Added instructions follow exactly the format and structure of the base RISC instructions. A fixed part of the instruction encoding is reserved for new instructions to be implemented in reconfigurable logic. One field of the instruction word constitutes an ID that corresponds to the logic for the implementation of one combinatorial logic function. Each added instruction has access to the same two source register operands as the other instructions. Each added instruction may create one result operand, and must produce its result in one processor cycle. This result is written into the base processor's register file and the result is the same width as the base processor's word width. When an extended instruction is being executed, no other instruction executes in parallel. Furthermore, the logic for each added instruction is distinct and is not shared with the logic of any other. This allows the configuration for each instruction to be loaded dynamically in response to program usage, so the field-programmable logic serves as a cache of commonly used extended instructions. On the other hand, this prevents sharing of logic between instructions and higher logic costs for a group of instructions.

S. Hauck, T. W. Fry, M. H. Hosler, J. P. Kao, "The Chimaera Reconfigurable Functional Unit", Proceedings of the IEEE Symposium on Field-Programmable Custom Computing Machines, 1997 describe a hybrid design which attempts to further improve the operand bandwidth between the base processor's register file and the reconfigurable function units. A subset of the general-purpose RISC processor's registers are shadowed in the field configurable unit, that more than two can be used as source operands. This, however, dramatically increases the number of wires that must run from the register file into the field-configurable logic. However, only one result operand can be created per cycle, its width is limited to the word width of the base RISC processor, and it is not pipelined so the computation must complete in one cycle following the decoding of the extended instruction.

Limitations of Existing Inventions

Limitations of existing inventions that have been recognized by the present inventors can be summarized as follows:

1. Loosely-coupling of the processor and field-programmable logic dictates very long latency and low bandwidth. In addition, the operations of the field-programmable logic cannot be closely coordinated by the processor or controlled by software. This leads to lower performance, more difficult development and fewer opportunities to exploit joint operations by the two subsystems.

2. Tightly coupling between a RISC processor and RISC-type extended instructions limits parallelism. In RISC processors, computation instructions (instructions that write new values into the register file based on values in the register file) generally execute in one cycle. Either a base instruction or an extended instruction can be issued and executed at one time in the pipeline, but not both. Furthermore, if there are multiple reconfigurable function units, only one can be executing an instruction in any cycle. There is no effective overlap in execution.

3. Tight coupling between a RISC processor and RISC-type extended instructions limits speed-up from new instructions. RISC-type instruction encoding typically allows just two source registers to be specified. Therefore new instructions added via reconfigurable logic are limited to two source operands. The benefit of application-specific instruction set extension springs from replacement of a long sequence of generic instructions with a short sequence of special instructions. Unfortunately, few long sequences of generic instructions rarely have just two source operands. Only is special situations can a single RISC instruction replace more than a handful of generic instructions. Providing for access to additional general registers, as in Hauck et al, can improve the potential speed-up, but these references are implicit in the definition of instructions so the choice of registers is severely limited. This reduces the usefulness of these instructions with more than two source registers and makes generation of code from compilers very difficult.

4. The lack of function unit pipelining reduces the possibility of implementing a deep logic function in a single instruction. The most valuable possible instruction set extensions often involve combining several complex arithmetic and other operations into a single instruction. This logic may have a longer delay, particularly when implemented in slow field-programmable logic, than the normal cycle time of the processors. Either these instructions must be avoided, or the processor must be stalled in some fashion to wait for this result before issuing the next instruction. Either method reduces the potential speed-up of hybrid microprocessors.

5. All previously known methods for tightly-coupled reconfiguration provide only for new combinatorial functions on the general-purpose processor registers. No new state registers can be added. This limits the bandwidth of access to data and prevents updating of complex intermediate state within a long sequence of calculations. The existing limitation to just one result, with width equal to the base processor word, is particularly troublesome. If new state registers or complete register files could be added, the opportunities for large acceleration of applications would be greatly increased.

6. The existing restriction to simple RISC-type instruction formats limits flexibility and performance. When new formats can be added, then new acceleration opportunities emerge. Two important classes of instruction formats are missing from current field-configurable processors. First, instruction formats that specify more than two source operands, where source operands may come from either the general-purpose registers of the base processor, or additional registers and register files within the field-configurable function units. Second, instruction formats that specify more than one result. Multiple result specifiers are useful either for encoding complex operations or for encoding several simple operations in a single word.

7. Existing tightly-coupled field-programmable function units are intended as a means to directly implement fast substitutes for general-purpose RISC instructions. They are not well suited for implementation of data-parallel operations such as Single Instruction Multiple Data (SIMD) or vector operations. This limitation appears both in the use of source and result data-paths that are only as wide as the base processors registers (typically 32 bits) and in the proposed methods for discovery and design of new instructions, that do not use vectorization techniques to discover cases where multiple iterations of a loop can be executed in parallel. Moreover, existing solutions are directed at accelerating the types of software algorithms typically found in general-purpose computer systems. These often involve wide integer data-types, especially 16 bit and 32 bit integers. Parallel operations involving large numbers of such wide operands are expensive in hardware. By contrast, in embedded applications such as signal and image processing, the real native data size is often quite small (10 bits or less) so the opportunities for parallel operations is much greater.

8. The bias of existing solutions also appears in the limited interface between the processor and other logic functions in the system. In practice, virtually all computer system data is passed through a centralized main memory, implemented in separate integrated circuits, before going into the processor. By contrast, in embedded electronic systems, the processor is often implemented in the same integrated circuit at memories, input/output interfaces and other specialized logic. To pass all data through a main memory would form a bottleneck. Direct interface of external logic to the processor would reduce latency and increase bandwidth for many operations.

9. The existing methods for development and use of application-specific instruction logic suppose that the logic for each added instruction is independent of the others. Each logic configuration can be loaded on demand, on the assumption that not all required extensions can fit in the available configurable logic array. This means that common logic cannot be easily shared, potentially leading to substantial duplication of logic functions when two instructions with overlapping implementations are both resident in the logic array.

Overcoming these limitations would greatly improve the performance of hybrid processors.

SUMMARY OF THE INVENTION

The current invention addresses the major limitations of existing solutions.

An advantage of the present invention is in allowing complex execution units to be implemented as tightly coupled instruction set extensions, with full software support and very high bandwidth between the base processor and extensions.

Another advantage of the present invention is providing automated pipelining of reconfigurable execution units allows many independent operations to be in progress at the same time, across the base processor and one or more extended execution units.

Another advantage of the present invention is providing flexible capability for implementation of deep pipelining in reconfigurable logic, thereby allowing complex functions to be implemented as single instructions.

Another advantage of the present invention is fully supporting both state registers and register files in the reconfigurable logic, including efficient implementation of all bypass and interlock logic.

Another further advantage of the present invention is implementing reconfigurable execution units in instruction formats not available in the base processor. A wide variety of formats can be simultaneously supported, limited only by the register specifier templates.

Another further advantage of the present invention is providing reconfigurable execution units that contain registers, register files and data paths of various widths, limited only by the capacity of the reconfigurable logic fabric. Wide data paths make parallel processing of several operands within a single data word possible and efficient.

A still further advantage of the present invention is the usage of a flexible interface between the processor and the extended execution units allows a block of reconfigurable logic to be shared by several processors, or by a processor and other logic. Optional interface for the processor include memory-mapped data port access to other processors and outside logic (possibly through clock and bandwidth-matching queues), and direct import and export of signals between reconfigurable execution units and other logic.

Another advantage of the present invention is that it allows all of the logic for a set of instructions to be synthesized together to find common sub-functions and reducing the overall logic area and delay for a group of instructions to be used together.

Accordingly, the present invention provides in one aspect a hybrid processor design comprising a non-configurable base processor design with base processor instructions suitable for different applications and at least one configurable execution unit design that is tightly-coupled to the non-configurable base process design, with each execution unit design capable of implementing extended instructions that each perform a complex operation.

BRIEF DESCRIPTION OF THE DRAWINGS

The above and other aspects, features, and advantages of the present invention are further described in the detailed description which follows, with reference to the drawings by way of non-limiting exemplary embodiments of the present invention, wherein like reference numerals represent similar parts of the present invention throughout several views and wherein:

FIG. 5 is an exemplary table of register specifier formats for a hybrid processor according to the present invention;

DETAILED DESCRIPTION OF THE PREFERRED EMBODIMENT

The present invention implements hybrid application-specific microprocessors using a combination of a base processor implemented in a technology that permits high clock frequency, low cost and low power, and a reconfigurable logic fabric that is tightly coupled to the base processor and can be quickly adapted to implement a broad range of possible application-specific instructions and interfaces. This combination allows rapid personalization of a standard electronic system into an application-specific microprocessor with high clock frequency and a small number of cycles required to implement each application.

In the hybrid processor according to the present invention, as described, an essential benefit that is obtained from using tightly-coupled reconfigurable logic is this: a long sequence of generic processor instructions—typically a combination of basic arithmetic, shift and logical instructions—is replaced by a much shorter sequence of specialized instructions that implement the equivalent function in a new form. Other operations, such as memory operations (load, store), control flow (branch, jump) and systems functions (interrupt handling, context switching), primarily use the existing logic of the base processor.

Figure 1:
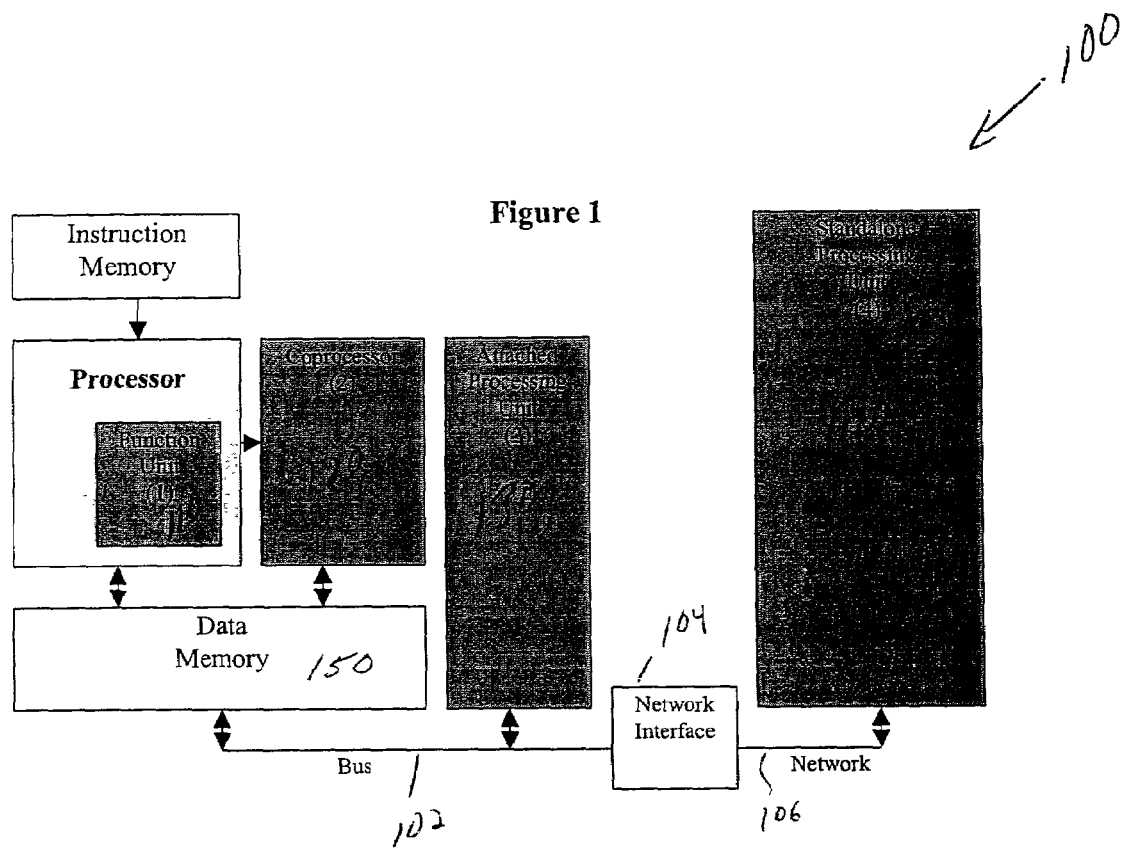
FIG. 1 illustrates a collection of conventional hybrid processor designs.
Figure 2:
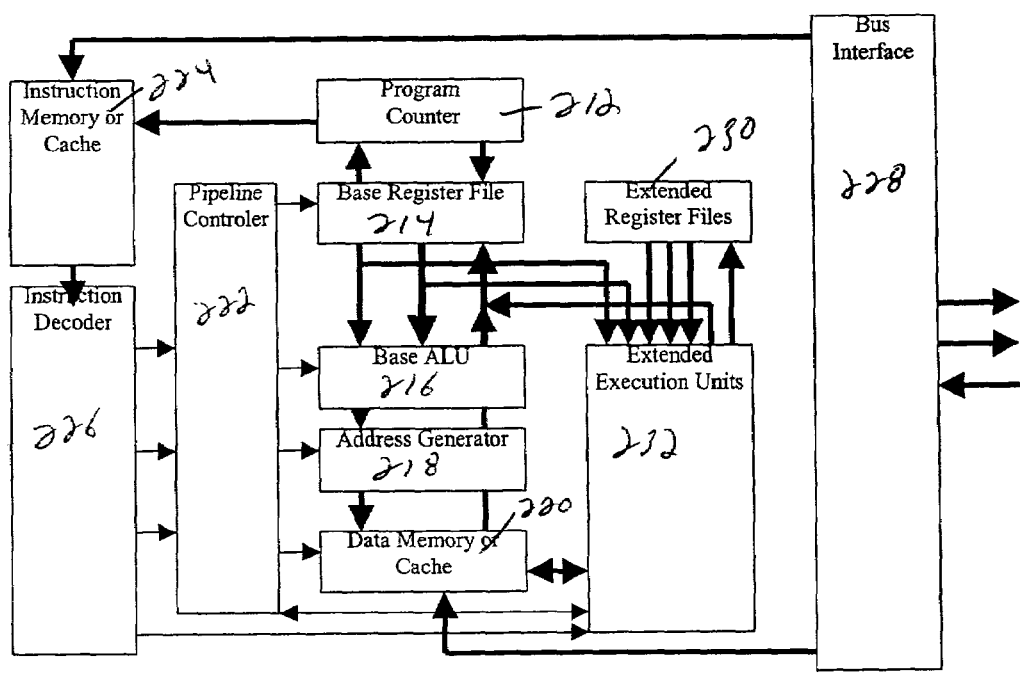
FIG. 2 illustrates a block diagram of a hybrid processor according to the present invention.

The essential structure of the hybrid processor 200, including the base processor, the reconfigurable logic, instruction and data memories and bus interfaces, are shown in FIG. 2. It should be noted that reconfigurable is used herein to connote the largest potential scope of applications, which would includes systems that can be configured and thereafter reconfigured as desired. This should not be read as limiting, since the present invention will also cover systems that use the teachings herein for systems that are simply configured and then used as configured.

As illustrated the base processor includes a program counter 212, base register file 214, base ALU 216, address generator 218, data memory or cache 220, pipeline controller 222, instruction memory or cache 224, instruction decoder 226, and bus interface 228.

The reconfigurable logic includes extended register files 230 and extended execution units 232, as well as portions of the data memory or cache 220, pipeline controller 222, instruction memory or cache 224, instruction decoder 226. It is also understood that certain portions of the base processor will interact with the reconfigurable logic. For example, the base processor may be responsible for data loads and stores, as well as cache and memory management operations. The extended execution units 232 may well use the load store unit within the base processor. As another example, the base processor will typically contain base processor status registers, exception handling registers and other processor control functions. The extended execution units 232 within the reconfigurable logic may generate exceptions. Further, the base processor may contain other closely coupled system peripherals—bus interfaces, timers, debug interfaces, and other specialized interfaces that could be accessed by the extended execution units. Considerations for the implementation of the reconfigurable logic with the base processor will be described hereinafter.

The hybrid processors 200 implemented by this method can use the broad range of instruction set extensions created by an automatic processor generator, such as the Xtensa processor described in, for example, A. Wang, E. Killian, D. Maydan, C. Rowen, "Hardware/Software Instruction Set Configurability for System-on-Chip Processors", Proceedings of Design Automation Conference, 2001. The extended instructions may each include simple RISC-type instructions with two source operands and one result operand, but also a wide range of other instruction functions and processor logic implementations, including the following, thereby being able to perform complex operations:

1. Instructions with processor memory as a direct source or destination for operands;

2. Instructions with one or more state registers or register files implemented in the configurable logic fabric;

3. Instructions with a large number of register specifier fields;

4. Instructions with basic formats unlike those of the base processor architecture;

5. Instructions with latency greater than one processor clock cycle, as seen by the processor and supported by configurable processor interlock and bypass logic, which may be fully or partially pipelined to allow significant parallelism between base instructions and instructions implemented in the reconfigurable fabric, or between several instruction all implemented in the reconfigurable fabric;

6. Instructions that operate on operands wider than the native width of the base processor;

7. Instructions that combine more than one basic operand into a single source and/or result compound operand and perform simple or complex operations on all basic operands in parallel;

8. Implementations where the base processor is implemented in custom semiconductor circuits or semi-custom standard cell or gate array circuits and the reconfigurable logic is implemented with field-programmable logic or field-configurable data-path elements; or 9. Implementations where the base processor is implement in custom semiconductor circuits and the reconfigurable logic is implemented with semi-customer standard cell or gate array circuits.

Figures 3, 4:
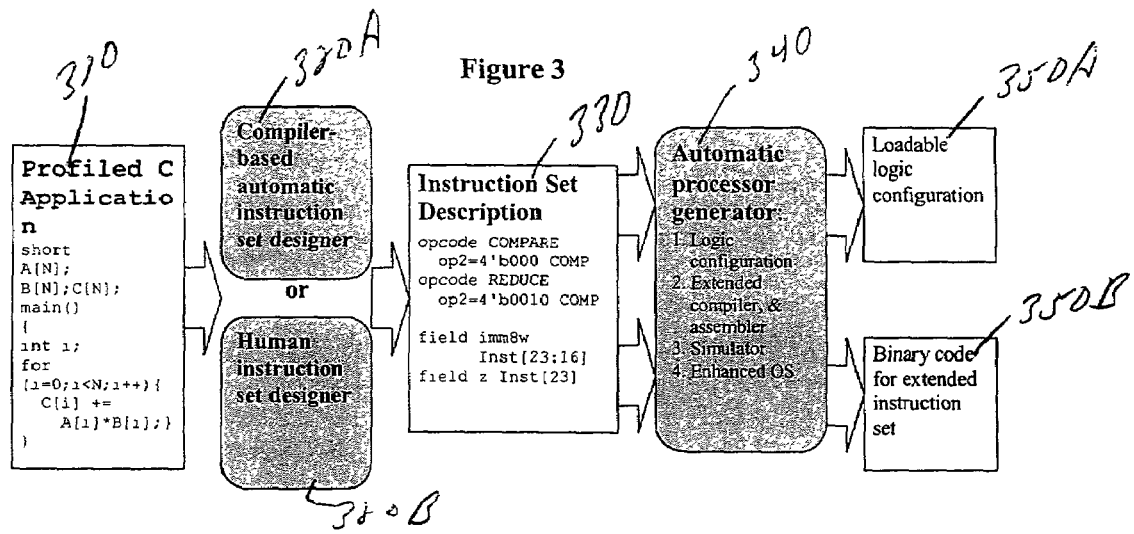
FIG. 3 illustrates generation of a hybrid processor according to the present invention.
FIG. 4 illustrates an embodiment of a hybrid processor with pipelined stages according to the present invention.

The generation of new hybrid processor configurations follows the method generally illustrated in FIG. 3. This method includes profiling of the target application set as illustrated by step 310 to identify critical sections of code, typically based on simulation of the application code. The development of instruction set extensions as shown in step 320 using a high-level instruction set description language (using compiler-automated 320A or manual 320B techniques). Step 330 illustrates the development of an intermediate representation—the instruction set description—using a language such as TIE, as described, for example, in A. Wang, E. Killian, D. Maydan, C. Rowen, "Hardware/Software Instruction Set Configurability for System-on-Chip Processors", Proceedings of Design Automation Conference, 2001. This instruction set description includes all the basic information necessary for encoding, semantics and pipelining of the instruction and its implementation as part of the processor. Step 340 illustrates processor generation, in which a set of extended instructions are translated into 1) the configuration of the configurable execution units—in the form of a logic description or netlist, 2) extended software tools such as compiler, assembler, debugger, and libraries 3) simulator for the extended processor, and 4) runtime software, such as real-time operating systems that support the extended instruction set. The compiler, assembler and libraries can be used by standard methods to create the binary code for the application that includes use of the extended instruction set. Thereafter, evaluation step 350 takes place, which includes the evaluation as shown in step 350A of the size and speed of the logic implemented in reconfigurable logic as well as the evaluation as shown in step 350B of the application speed by running application binary.

A central innovation of this new method is the support for complex instruction set extensions via reconfiguration of programmable logic into new execution units. These include may include wide data paths, additional register files and pipelining of execution across multiple clock cycles. An example is shown in FIG. 4.

FIG. 4 shows the hybrid processor 200 in a functional representation that illustrates the various pipe stages. As shown, the instruction memory (corresponding to instruction memory 224 of FIG. 2), the decoder and the interlock and bypass calculation logic (together corresponding to the instruction decoder 226 and pipeline controller 222 of FIG. 2) and logic (corresponding to the base ALU 216 and associated circuits of FIG. 2) may appear in each pipe stage that consumes source operands or produces results. FIG. 4 also shows the basic pipeline structure. This example has a five stage pipe for base processor instructions and a seven stage pipe for extended function units, though any number of base and extended function unit pipe stages can be accommodated. It shows base registers (corresponding to the base register file 214 of FIG. 2), but the base processor could include multiple register files, for example. Address registers, floating point registers and condition code registers are also included, as is conventional, and are specific examples of register files in that make up the base registers shown.

FIG. 4 also shows two source operands (read ports) and one result (write port), flowing from and back into the base register file, although it is understood that the base processor register files could have more read ports or more write ports. As shown, this can be used for any base instruction, including ALU, memory and control instructions. It should also be understood, however, that one could have a base processor and base instruction set with more registers files, and more source and result ports, as the invention described is not restricted by the particular base instruction set or pipeline.

Although not shown explicitly in FIG. 4, in the preferred embodiment the extended execution units have access to the source data from the base register files, and that extended execution units can product results that flow back to extended register files and base register files or both.

Similarly, the base execution units—spread across multiple cycles in the blocks labeled "Extended Logic"—may have various word widths. For example, the operation on the address registers could be 32 bits, the operations on the floating point registers could be 64 bits and the operations on the condition code registers could be one bit wide. The reconfigurable execution units have the same variety. They may be of different widths; they may have multiple register files; the pipelines may be shorter or longer than the base processor pipeline. Note that the address for data memory loads and stores may come from either the base processors execution units, or from reconfigurable execution units.

FIG. 4 also shows the basic form of interlock and bypass operations within the processor. If a microprocessor computation takes more than one pipeline stage, a subsequent instruction may be waiting for that result. An interlock mechanism is a feature that detects this condition by comparing the destination register of the first instruction against the source registers of the second instruction. If they match, the processor must delay execution of the second until the first has produced a result. In a pipelined processor, source operands usually are read from a register file. Results of an instruction are written back into the register files only after the instruction, and its predecessors, are known to complete without errors. If a result is produced in an early pipe stage, it may be forced to wait one or more cycles before being written. A bypass mechanism allows a subsequent instruction awaiting this result to get this result value as a source without writing and then reading the register file. Previous reconfigurable processors have not implemented reconfigurable pipelined execution units with reconfigurable bypass and interlock controls.

A key aspect of this invention is a mechanism for implementing a hybrid bypass and interlock mechanism that coordinates behavior of the base processor, including the results of instructions in the base pipeline, and behavior of the extended execution units, implemented in field programmable logic. This mechanism ensures that result data is passed correctly among pipe stages of the extended execution units, and between the base processor and the extended execution units. It also stalls the hybrid processor 200, including the issuing of new instructions to both the base processor and the extended execution units until awaited results are available to new instructions. The essential tasks for computing interlock and bypass conditions are the following:

1. Track the source and destination registers for the instruction at each stage in the processors pipelines. There may be several sources and several destinations for each instruction 2. In each pipe stage, compare each of the source register specifiers required in that pipe stage against each of the destination register specifiers intended to go to that register file.

3. Whenever a result has already been created, but is waiting to be written to the register file (waiting until all previous instruction are known to have completed safely), and is needed as a source operation, bypass the actual result value to the source operand input of the execution unit, in the place of the source value from the register file.

4. Whenever a result is not yet available, because it is still being computed in an execution pipeline, stall the dependent instruction until the result is available, and can be bypassed.

One principal challenge for design of hybrid processors is the gap in circuit performance between the base processor, implemented in a high speed logic technology—for example, standard cells—and the reconfigurable execution units, implemented in a lower performance logic technology—for example, FPGA Look Up Tables (LUTs) and programmable interconnect. This gap is particularly important at those places in the interface between the two subsystems, especially where the base processor communicates some condition, and the reconfigurable logic must make a response within the requirements of the base processors high-clock rate pipeline. The following lists enumerate the major types of communication between base processor and reconfigurable execution units:

From Base to Reconfigurable Units:

Instruction word, including register specifiers, operation specifiers and immediate values, including, potential one-hot encoding of certain commonly used signals to ease decoding in reconfigurable logic of the details of the reconfigurable instructions. These added signals may include information on instruction length, instruction format or additional decoding of certain instruction fields.

Source operands read from the base register file(s) or bypassed results from previous base processor instructions to be used as source operands Load data read from data memory or cache Control information, including stall, exception and other operating mode information (e.g. privilege level).

From Reconfigurable Units to Base:

Result operands to be returned to the base register file(s) and bypassed to base execution units Store data to be written into data memory or cache Control information, (e.g. error indications to be used to cause exception response and instruction execution cancellation)

Note that in the preferred embodiment the reconfigurable execution units are not directly responsible for calculating stall information to be used by the base processor. This is all computed within the base processor, using a set of reconfigurable instruction format and dependence templates. The use of such templates is an important innovation because it solves the most significant problem imposed by the difference in speed between the base processor and the reconfigurable units—the coordination of the pipelines.

The base processor logic can implement generalized reconfigurable stall logic using the following mechanism.

1. A portion of the total instruction encoding space is allocated to reconfigurable instruction set extension. This may allow addition of tens or hundreds of instructions in addition to the instruction set of the base processor. These instructions slots can be statically allocated into to scheduling groups.

2. A reconfigurable table contains two values for each group of instruction slots:

Instruction format number—an identifier of one of the supported instruction templates that defines the location and size of all register specifiers (used by reconfigurable instructions) within the instruction word. For example, the hybrid processor 200 might define eight register specifiers formats as shown in FIG. 5 below, and encode the choice for each instruction group in a three bit field.

A use/def number—an identifier of one of the supported sets of pipeline depths for the reconfigurable execution units. For example, the hybrid processor 200 might define the following table of possibilities for the pipe stage in which a source operand is required (use) and the pipe stage in which a result is generated (def), and encode the choice for use/def set in a two bit field.

| | Operand 1 | Operand 2 | Operand 3 | Operand 4 | Operand 5 | Operand 6 |
|---|---|---|---|---|---|---|
| Set 0 | Use 1 | Use 1 | Def 3 | Use 1 | Use 1 | Def 3 |
| Set 1 | Use 1 | Use 1 | Use 3 Def 6 | Use 1 | Use 1 | Def 3 |
| Set 2 | Use 1 | Use 1 | Use 1 Def 3 | | | |
| Set 3 | Use 1 | Def 3 | | | | |

All the extended instructions in an instruction group will have the same instruction format and use/def pattern. If there are more instructions with the same format and use/def pattern than instructions in a group, more than one group can be used. The same format and use/def information used for configuring these templates can also be used for generating the detailed instruction opcode assignment and decode logic, automating the pipelining of the logic, and automatically generating a cycle-accurate simulator and code scheduler.

There are two basic approaches to coordination the difference in logic speed between the base processor and the reconfigurable execution units.

First the reconfigurable logic may be deeply pipelined. This means that all intermediate values in the reconfigurable pipeline are captured in pipeline registers clock by the same clock as the base processor. This fits very well, for example, into some FPGA architectures that associate a flip-flop with each LUT with no extra cost in area or time. This fully exploits the capability of the processor generator to implement software tools that model the pipeline in simulators and generates and schedules code that hides the pipeline latency of these operations. This deeply pipelined approach may require pipelines that are much deeper in the reconfigurable logic than for the same logic in the base processor. For example, for a 0.18 micron standard cell process, a worst case clock rate of 200 MHz is feasible (each pipe stage executes in 5 ns). The reconfigurable logic in FPGA might be four times slower, requiring at least four pipe stages for each one that would have been required to implement the same logic in a standard cell-based pipeline. This approach has the advantage of a high repeat rate—a new extended operation could be initiated in the reconfigurable pipeline every base processor cycle.

Figure 6:
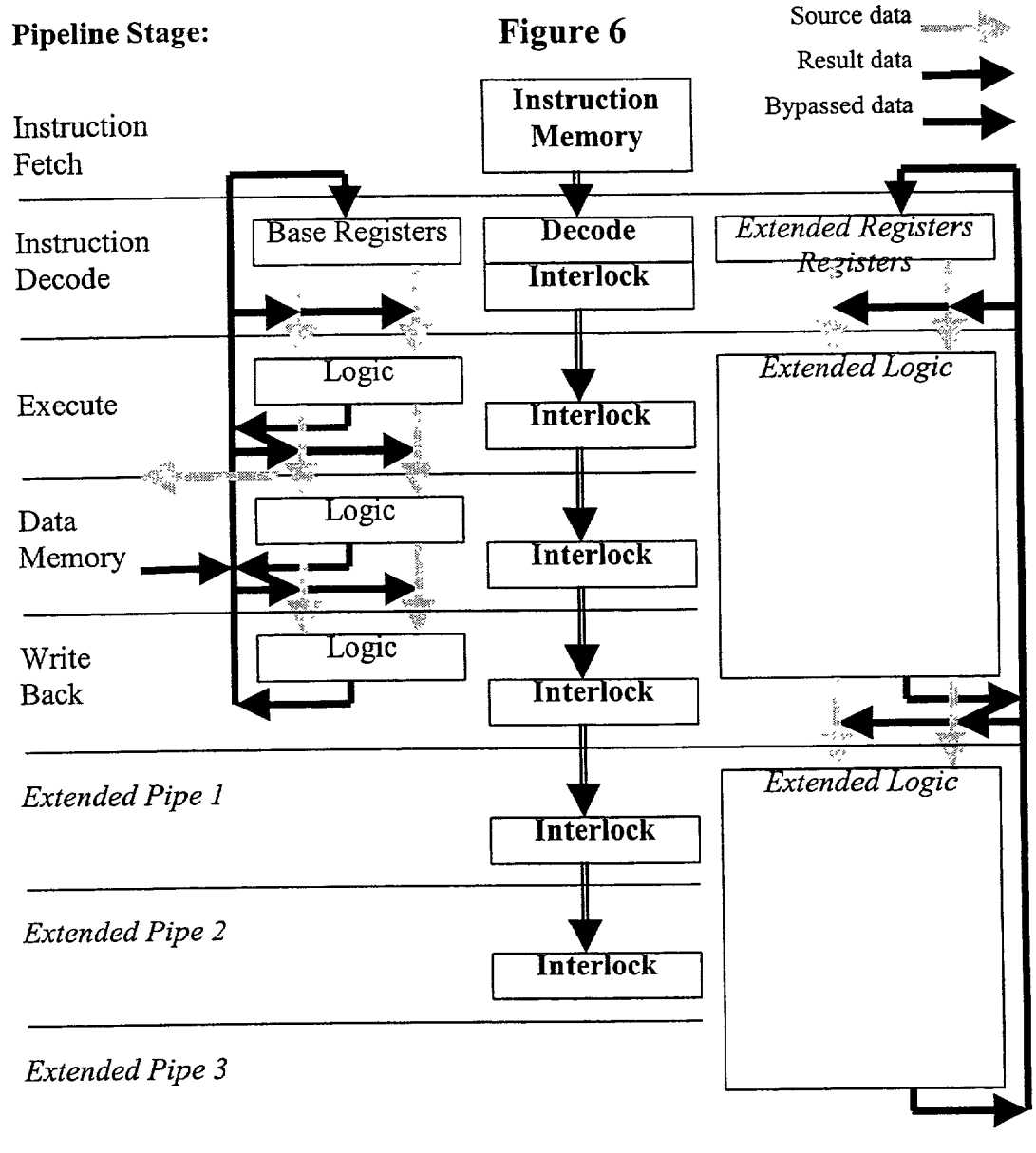
FIG. 6 illustrates another embodiment of a hybrid processor with pipelined stages according to the present invention.

Second, the reconfigurable logic can run at a slower clock rate, typically so that the base processor's clock is an integer multiple of the reconfigurable logic clock. The base processor would still see the reconfigurable units as deeply pipelined—having a long latency, but the reconfigurable logic would not have the timing overhead of extra pipeline registers. For example, for a 0.18 micron standard cell process, a worst case clock rate of 200 MHz is feasible (each pipe stage executes in 5 ns), while the reconfigurable logic implemented in FPGA technology might implement similar logic with an actual clock frequency of 50 MHz (each pipe stage executes in 20 ns). The base processor would consider the unit to be running four times the clock rate, but with four times the pipeline depth and with the capability of absorbing a new operation only every fourth base processor cycle. The two-clock hybrid is shown in FIG. 6, with a divide-by-three reconfigurable execution unit clock.

There are several variations. The base processor and reconfigurable logic clock can be asynchronous with respect to one another, though the cost of clock resynchronization for each signal at the boundary may be high. There may be more than one reconfigurable execution unit, and each may have its own clock divisor relative to the base processor clock.

Figure 7:
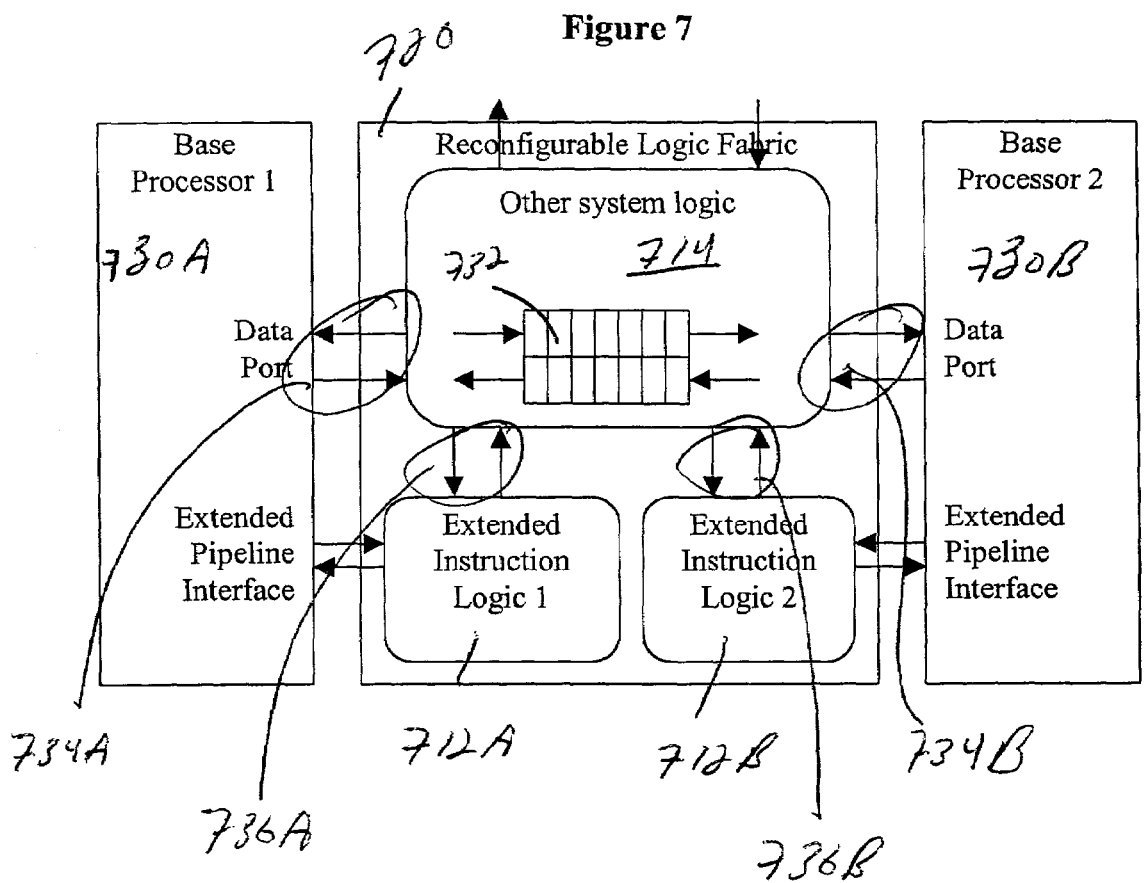
FIG. 7 illustrates another embodiment of the present invention.

The implementation of a hybrid extensible processor that combines a more fixed implementation of the base processor and a more reconfigurable logic fabric for instruction set extensions creates three further important innovations, all based on sharing the reconfigurable fabric with other functions implemented in close association, as shown in FIG. 7:

1. Instruction set extensions (shown as 712A and 712B) and non-processor logic 714 can share a single block 710 of reconfigurable logic, with the two uses logically separated but physically intermixed to achieve best utilization of the available reconfigurable fabric. The base processor (either 730A or 730B as shown) can use its normal data read and write capabilities to read and write state elements mapped into the address space of the base processor and serving as a high-bandwidth, low-latency data port between the base processor and other functions. Incoming and outgoing data queues might be used to accommodate different clock frequencies of data production/consumption rates, or to hide the details of pipeline behavior (instruction stall and cancellation, for example) from the external logic. Non-processor logic can, for example, be used to implement data buffering logic such as data queues, autonomous computation functions based on state machines not tied to instruction execution such as iterative encryption engines, standard data input/output such as serial interface channels, processor support functions such as bus monitoring or debug hardware support, or any other logic function commonly implemented in field-programmable or standard cell logic.

2. Two or more base processors (730A or 730B as shown) can share a unified reconfigurable logic fabric 720. This allows better utilization of the fabric and provides a natural mechanism for communication between processors that can often be higher bandwidth and lower latency than general bus transfers. Both processors can use the memory-mapped interface method of item 1, above. Then queues and other logic 732 can be configured to tie the two processors' data ports 734A and 734B together.

3. Other logic implemented in the reconfigurable fabric can communicate directly with extended instructions via bus 736A and 736B, but defining instructions in which arbitrary signals in the other logic can be imported as source operands into instruction execution, and any values written to destination registers can be exported to drive signals into the other logic. This leads to very fast, simple communications of specialized information.

Although various preferred embodiments have been described in detail above, those skilled in the art will readily appreciate that many modifications of the exemplary embodiment are possible without materially departing from the novel teachings and advantages of this invention. For example, in the above descriptions there are always some instructions implemented in the base processor, and the additional instructions (extensions) are done in field programmable logic. In the extreme, all instructions can require field-programmable logic, and the base processor contains just the infrastructure to fetch and issue instructions. Thus, while in many cases it is preferable, it is not necessary that some set of instructions be fully implemented in the base processor. Accordingly, the present invention should be interpreted in light of the following claims.

The invention claimed is:

1. A hybrid processor comprising:
   a non-configurable base processor having a base execution unit for executing base processor instructions;
   a configurable logic circuit having an extended execution unit for executing extended instructions different from the base processor instructions, wherein at least a single one of the extended instructions specifies at least two source operands, and at least one destination operand different from either of the source operands; and
   an interface circuit between the non-configurable base processor and the configurable logic circuit having:
   a first uni-directional datapath from the base processor to the configurable logic circuit for transfer of first data corresponding to a first one of the source operands, wherein the first data is one of a source operand specifier and a source operand value;
   a second uni-directional datapath from the base processor to the configurable logic circuit for transfer of second data corresponding to a second one of the source operands, wherein the second data is one of the source operand specifier and the source operand value, and
   a third uni-directional datapath from the configurable logic circuit to the base processor for transfer of third data corresponding to the destination operand, wherein the third data is one of a destination operand specifier and a destination operand value,
   wherein execution of the single extended instruction by the configurable logic circuit initiates the transfers of data on the first, second and third uni-directional datapaths, and further thereby causes the source operands to be used to compute the destination operand.

2. The hybrid processor of claim 1, in which the base processor includes uses one of custom logic circuit and standard cell circuit and the configurable logic circuit includes a usage of field programmable logic circuit.

3. The hybrid processor of claim 2, wherein the field programmable logic is implemented with RAM-based look-up tables.

4. The hybrid processor of claim 2 wherein the the base processor and the configurable logic circuit are each implemented as a semiconductor device.

5. The hybrid processor of claim 1, in which the base processor includes a custom logic circuit and the configurable logic circuit includes standard cell or gate-array logic circuits.

6. The hybrid processor of claim 5 wherein the base processor and of the configurable logic circuit are each implemented as a semiconductor device.

7. The hybrid processor of claim 1, wherein the base processor has registers of 32 bits in width.

8. The hybrid processor of claim 1, wherein the base processor supports at least 16 general purpose registers and the base instruction format uses less than 32 bits.

9. The hybrid processor of claim 1, wherein the extended execution unit of the configurable logic circuit has a plurality of pipeline stages that perform respective portions of the execution of the single extended instruction by the extended execution unit over more than one clock cycle of the extended execution unit.

10. A hybrid processor according to claim 9, wherein the single extended instruction includes a pipeline set identifier that defines a first pipeline stage in which one of the source operands is required and a second pipeline stage in which the destination operand is generated.

11. The hybrid processor of claim 1, wherein at least one of the extended instructions operate on extended registers or extended register files in the configurable logic circuit.

12. The hybrid processor of claim 1, wherein the configurable logic circuit further includes a fourth operand datapath having a first bit width wider than a second bit width of registers of the base processor for use by at least one of the extended instructions.

13. The hybrid processor of claim 12, wherein the fourth operand datapath is used by the extended execution unit when it is performing the same operation in parallel on each of several operands within a data word during execution of the at least one extended instruction, the fourth operand datapath being used to transfer the data word during execution of the at least one extended instruction.

14. The hybrid processor of claim 12, wherein at least another one of the extended instructions includes more than two source register specifiers for a single instruction execution.

15. The hybrid processor of claim 1, wherein at least one of the extended instructions uses more than two source register specifiers for a single instruction execution.

16. The hybrid processor of claim 1, wherein at least one of the extended instructions computes more than one result for a single instruction execution.

17. The hybrid processor of claim 1, wherein the configurable logic circuit is pipelined with a same clock as the base processor.

18. The hybrid processor of claim 1, wherein the base processor has access via load and store operations to non-processor logic implemented in the configurable logic circuit.

19. The hybrid processor of claim 1, further including at least another non-configurable base processor with instructions suitable for different applications and wherein the non-configurable base processor and the another non-configurable base processor share the configurable logic circuit, and wherein extended instructions of the non-configurable base processor and the another non-configurable base processor are implemented in the configurable logic circuit.

20. The hybrid processor of claim 1, wherein the extended instructions have direct access to non-processor logic implemented in the configurable logic circuit to serve as source operands to instructions.

21. The hybrid processor of claim 1, wherein results of extended instructions are directly available to non-processor logic implemented in the configurable logic circuit.

22. The hybrid processor of claim 1, wherein some of the extended instructions are selected by a user configuring the configurable logic circuit by choosing from a menu of pre-defined optional instructions.

23. The hybrid processor of claim 1, wherein some of the extended instructions are defined using an instruction description language.

24. The hybrid processor of claim 1, wherein some of the extended instructions extended in the extended execution unit and are defined by a software program analyzing an application written in a high level language.

25. The hybrid processor of claim 1, wherein some of the extended instructions are obtained based upon profiling an application, wherein the profiling includes running the application on a simulated version of the base processor and counting processor cycles required to execute the application to determine performance-critical sections.

26. The hybrid processor of claim 1 wherein pipeline interlocks or bypass within the base processor are computed using the source and destination operand specifiers.

27. The hybrid processor of claim 1, wherein the base processor and the configurable logic circuit are implemented together on a single semiconductor substrate.

28. The hybrid processor of claim 1, wherein the base processor, the configurable logic circuit and other configurable or non-configurable logic functions or memories are implemented together on a single semiconductor substrate.

29. The hybrid processor of claim 1, wherein the configurable logic circuit runs asynchronously to the base processor, and certain signals going between the configurable logic circuit and the base processor pass through at least one synchronizing circuit.

30. The hybrid processor of claim 1 wherein the configurable logic circuit is reconfigurable.

31. The hybrid processor of claim 1 wherein the configurable logic circuit further includes extended register files.

32. A hybrid processor according to claim 1, wherein the extended instructions include at least one of:
an instruction with processor memory as direct source or destination for operands;
an instruction with one or more stage registers or register files implemented in the configurable logic circuit; and
an instruction that combines more than one basic operand into a single source and/or result operand and performs operations on all basic operands in parallel.

33. A hybrid processor according to claim 1, wherein the base processor includes a first plurality of pipeline stages for executing respective portions of the base processor instructions, and the configurable logic circuit includes a second plurality of pipeline stages for executing respective portions of the extended instructions, the first and second pluralities of pipeline stages being different.

34. A hybrid processor according to claim 1, wherein the extended instructions include an instruction format number that defines the location and size of all register specifiers for the extended instructions.

35. A hybrid processor according to claim 1, wherein the first, second and third uni-directional datapaths provide the first, second and third data within one cycle of the base execution unit and extended instruction unit, respectively.

36. A hybrid processor according to claim 1, wherein the base execution unit and extended execution unit operate at first and second clocks, respectively, that are kept in synchronization.

37. A hybrid processor according to claim 36, wherein the first and second clocks have the same frequency.

38. A hybrid processor according to claim 36, wherein the first clock is an integer multiple of the second clock.

39. A hybrid processor according to claim 1, wherein the extended execution unit includes a plurality of pipeline stages, and wherein one of the source operands is used at a first one of the pipeline stages and the destination operand is defined at a second one of the pipeline stages in accordance with certain bits in the extended instructions.

40. A hybrid processor according to claim 1, wherein the interface circuit further includes a plurality of signals corresponding to a currently executing extended instruction that are derived by the base processor, wherein the extended execution unit executes the current extended instruction in accordance with the plurality of signals.

41. A hybrid processor according to claim 40, wherein the plurality of signals includes one or more of a register specifier, an operation specifier, an immediate value, instruction length and instruction format.

42. A method of making a hybrid processor comprising the steps of:
  providing a non-configurable base processor having a base execution unit for executing base processor instructions;
  determining a configurable logic circuit having an extended execution unit for executing extended instructions different from the base processor instructions, wherein at least a single one of the extended instructions specifies at least two source operands, and at least one destination operand different from either of the source operands; and
  providing an interface circuit between the non-configurable base processor and the configurable logic circuit having:
    a first uni-directional datapath from the base processor to the configurable logic circuit for transfer of first data corresponding to a first one of the source operands, wherein the first data is one of a source operand specifier and a source operand value;
    a second uni-directional datapath to the base processor to the configurable logic circuit for transfer of second data corresponding to a second one of the source operands, wherein the second data is one of the source operand specifier and the source operand value, and
    a third uni-directional datapath from the configurable logic circuit to the base processor for transfer of third data corresponding to the destination operand, wherein the third data is one of a destination operand specifier and a destination operand value,
  wherein execution of the single extended instruction by the configurable logic circuit initiates the transfers of data on the first, second and third uni-directional datapaths, and further thereby causes the source operands to be used to compute the destination operand.

43. The method of claim 42, further including the steps of:
  implementing the non-configurable base processor using one of custom logic circuit and standard cell circuit; and
  implementing the configurable logic circuit includes a field programmable logic circuit.

44. The method of claim 43, wherein the step of implementing implements the field programmable logic circuit with RAM-based look-up tables.

45. The method of claim 43 wherein the steps of implementing implement the base processor and the configurable logic circuit as a semiconductor device.

46. The method of claim 42, further including the steps of:
  implementing the base processor using a custom logic circuit; and
  implementing the configurable logic circuit includes the usage of standard cell or gate-array logic circuits.

47. The method of claim 46 wherein the steps of implementing implement the base processor and the configurable logic circuit as a semiconductor device.

48. The method of claim 42, wherein the step of determining the configurable logic circuit includes providing the extended execution unit with a plurality of pipeline stages that perform respective portions of the execution of the single extended instruction by the extended execution unit over more than one clock cycle of the extended execution unit.

49. The method of claim 42, wherein the step of determining the configurable logic circuit includes providing at least one of the extended instructions that operates on extended registers or extended register files.

50. The method of claim 42, wherein the step of determining the configurable logic circuit includes providing a fourth operand datapath having a first bit width wider than a second bit width of registers of the base processor for use by at least one of the extended instructions.

51. The method of claim 50, wherein the fourth operand datapath is used by the extended execution unit when it is performing the same operation in parallel on each of several operands within a data word during execution of the at least one extended instruction, the fourth operand datapath being used to transfer the data word during execution of the at least one extended instruction.

52. The method of claim 42, wherein the step of determining the configurable logic circuit includes providing at least one of the extended instructions that uses more than two source register specifiers for a single instruction execution.

53. The method of claim 42, wherein the step of determining the configurable logic circuit includes providing at least one of the extended instructions that computes more than one result for a single instruction execution.

54. The method of claim 42, wherein the step of determining the configurable logic circuit includes providing a pipeline within the configurable logic circuit that is clocked with a same clock as the base processor.

55. The method of claim 42, wherein the step of providing the base processor includes providing the base processor with access via load and store operations to non-processor logic circuit implemented in the configurable logic circuit.

56. The method of claim 42, further including the step of providing at least another non-configurable base processor with instructions suitable for different applications and wherein the non-configurable base processor and the another non-configurable base processor share the configurable logic circuit, and wherein extended instructions of the non-configurable base processor and the another non-configurable base processor are implemented in the configurable logic circuit.

57. The method of claim 42, wherein the step of determining the configurable logic circuit includes providing extended instructions that have direct access to non-processor logic implemented in the configurable logic circuit to serve as source operands to instructions.

58. The method of claim 42, wherein the step of determining the configurable logic circuit includes providing results of extended instructions that are directly available to non-processor logic implemented in the configurable logic circuit.

59. The method of claim 42, wherein the step of determining the configurable logic circuit includes selecting some of the extended instructions by a user configuring the configurable logic circuit by choosing from a menu of pre-defined optional instructions.

60. The method of claim 42, wherein the step of determining the configurable logic circuit includes defining some of the extended instructions using an instruction executed in the extended execution unit description language.

61. The method of claim 42, wherein the step of determining the configurable logic circuit includes defining some of the extended instructions by a software program analyzing an application written in a high level language.

62. The method of claim 42, wherein the step of determining the configurable logic circuit includes obtaining some of the extended instructions based upon profiling an application, wherein the profiling includes running the application on a simulated version of the base processor and counting processor cycles required to execute the application to determine performance-critical sections.

63. The method of claim 42 wherein the step of providing the base processor includes providing pipeline interlocks or bypass that are computed using the source and destination operand specifiers.

64. The method of claim 42 further including the step of implementing the base processor and the configurable logic circuit together on a single semiconductor substrate.

65. The method of claim 42 further including the step of implementing the base processor, the configurable logic circuit and other configurable or non-configurable logic functions or memories together on a single semiconductor substrate.

66. The method of claim 42 wherein the step of determining the configurable logic circuit includes providing that the configurable logic circuit run asynchronously to the base processor, and further provides that certain signals going between the configurable logic circuit and the base processor pass through at least one synchronizing circuit.

67. The method of claim 42 wherein the step of determining the configurable logic circuit includes providing that the configurable logic circuit is reconfigurable.

68. The method of claim 42 wherein the step of determining the configurable logic block includes providing extended register files.

69. A method according to claim 42, wherein the interface circuit further includes a plurality of signals corresponding to a currently executing extended instruction that are derived by the base processor, wherein the extended execution unit executes the current extended instruction in accordance with the plurality of signals.

70. A method according to claim 69, wherein the plurality of signals includes one or more of a register specifier, an operation specifier, an immediate value, instruction length and instruction format.

71. A method according to claim 42, wherein the step of determining the configurable logic circuit further includes providing the extended execution unit with a plurality of pipeline stages, wherein the operand values are used and defined at certain of the pipeline stages in accordance with certain bits in the extended instructions.

* * * * *